(12) United States Patent
Tan et al.

(10) Patent No.: US 11,402,565 B2
(45) Date of Patent: Aug. 2, 2022

(54) DISPLAY SUBSTRATE, DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Xiandong Meng, Beijing (CN); Wenqing Zhao, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/265,221

(22) PCT Filed: Jul. 24, 2020

(86) PCT No.: PCT/CN2020/104063
§ 371 (c)(1),
(2) Date: Feb. 2, 2021

(87) PCT Pub. No.: WO2021/018024
PCT Pub. Date: Feb. 4, 2021

(65) Prior Publication Data
US 2021/0302643 A1    Sep. 30, 2021

(30) Foreign Application Priority Data
Jul. 29, 2019    (CN) .......................... 201910688816.0

(51) Int. Cl.
*F21V 8/00* (2006.01)
*G02F 1/1335* (2006.01)
(Continued)

(52) U.S. Cl.
CPC ......... *G02B 6/005* (2013.01); *G02F 1/13394* (2013.01); *G02F 1/133524* (2013.01);
(Continued)

(58) Field of Classification Search
None
See application file for complete search history.

(56) References Cited

U.S. PATENT DOCUMENTS 7,004,610 B2 * 2/2006 Yamashita ........... G02B 6/0065
362/606
2011/0234941 A1 * 9/2011 Gourlay ............... G02B 6/0041
349/64

FOREIGN PATENT DOCUMENTS

CN          1811549 A       8/2006
CN      202486473 U   * 10/2012
(Continued)

OTHER PUBLICATIONS

First office action issued in Chinese Patent Application No. 201910688816.0 with search report.

*Primary Examiner* — Ryan Crockett
(74) *Attorney, Agent, or Firm* — Chiwin Law LLC

(57) ABSTRACT

A display substrate is provided. The display substrate includes: an optical waveguide; a first buffer layer at a side of the optical waveguide, the first buffer layer including a first buffer pattern and a plurality of openings defined by the first buffer pattern; and a second buffer layer at a side of the optical waveguide provided with the first buffer layer and at least covering the plurality of openings, a refractive index of the first buffer pattern is less than a refractive index of the optical waveguide, and a refractive index of the second buffer layer is greater than the refractive index of the optical waveguide. A display panel and a display device are further provided.

20 Claims, 11 Drawing Sheets

(51) Int. Cl.
*G02F 1/1339* (2006.01)
*G02F 1/1343* (2006.01)
*G02F 1/1334* (2006.01)

(52) U.S. Cl.
CPC .. *G02F 1/133553* (2013.01); *G02F 1/133565* (2021.01); *G02F 1/133616* (2021.01); *G02F 1/134309* (2013.01); *G02F 1/134363* (2013.01); *G02F 1/13347* (2021.01); *G02F 1/13398* (2021.01); *G02F 1/133512* (2013.01); *G02F 2203/30* (2013.01)

(56) References Cited

FOREIGN PATENT DOCUMENTS

| | | | | | |
|---|---|---|---|---|---|
| CN | 202486473 | U | | 10/2012 | |
| CN | 105629556 | A | | 6/2016 | |
| CN | 207882620 | U | * | 9/2018 | |
| CN | 207882620 | U | | 9/2018 | |
| CN | 109239965 | A | * | 1/2019 | ........... G02F 1/1337 |
| CN | 109239965 | A | | 1/2019 | |
| CN | 109541850 | A | | 3/2019 | |
| CN | 109799568 | A | | 5/2019 | |
| CN | 109799655 | A | * | 5/2019 | ............ G02B 6/005 |
| CN | 109799655 | A | | 5/2019 | |
| CN | 110286525 | A | | 9/2019 | |
| JP | 2011112831 | A | | 6/2011 | |
| WO | 2014061511 | A | | 4/2014 | |

* cited by examiner

DISPLAY SUBSTRATE, DISPLAY PANEL AND DISPLAY DEVICE

CROSS-REFERENCE OF RELATED APPLICATIONS

This application is a U.S. National Phase Entry of International Application No. PCT/CN2020/104063 filed on Jul. 24, 2020, designating the United States of America and claiming priority to Chinese Patent Application No. 201910688816.0, filed on Jul. 29, 2019. The present application claims priority to and the benefit of the above-identified applications and the above-identified applications are incorporated by reference herein in their entirety.

TECHNICAL FIELD

At least one embodiment of the present disclosure relates to a display substrate, a display panel and a display device.

BACKGROUND

Liquid crystal display devices include directional liquid crystal display devices, in a liquid crystal display device, liquid crystal molecules in a liquid crystal layer present periodically arranged liquid crystal gratings, and display is realized by diffraction/refraction of liquid crystal gratings (lenses and prisms).

SUMMARY

At least one embodiment of the present disclosure relates to a display substrate, a display panel and a display device.

At least one embodiment of the present disclosure provides a display substrate, including: an optical waveguide; a first buffer layer at a side of the optical waveguide, the first buffer layer including a first buffer pattern and a plurality of openings defined by the first buffer pattern; and a second buffer layer at the side of the optical waveguide provided with the first buffer layer and at least covering the plurality of openings; a refractive index of the first buffer pattern is less than a refractive index of the optical waveguide, and a refractive index of the second buffer layer is greater than the refractive index of the optical waveguide.

For example, the optical waveguide includes a first portion and a second portion, the first portion is at a position of the first buffer pattern, and the second portion is at a position of the plurality of openings; the first portion is configured to allow light which propagates in the optical waveguide and irradiates on the first portion to be totally reflected; the second portion is configured to allow light which propagates in the optical waveguide and irradiates on the second portion to exit.

For example, the second buffer layer includes a plurality of buffer portions, each of the plurality of buffer portions fills one of the plurality of openings, and the plurality of buffer portions have different refractive indices.

At least one embodiment of the present disclosure further provides a display panel, including any one of the display substrates as described above and an opposite substrate opposite to the display substrate, the display substrate and the opposite substrate are sealed to form a cell, and a spacer pattern is arranged in the cell, the spacer pattern includes a plurality of spacers, and a space between adjacent spacers is filled with a liquid crystal material, and each of the plurality of spacers is configured to keep a thickness of the cell and absorb light irradiated thereon.

For example, a size of the space between adjacent spacers in a direction parallel with the optical waveguide is greater than a size of each of the plurality of openings in the direction parallel with the optical waveguide.

For example, an orthographic projection of the spacer on the optical waveguide falls within an orthographic projection of the first buffer layer on the optical waveguide.

For example, an orthographic projection of the spacer on the optical waveguide does not overlap with an orthographic projection of the plurality of openings on the optical waveguide.

For example, the display panel further includes a reflective element, the reflective element is at a side of the spacer close to the opposite substrate, and the reflective element has a reflective surface configured to reflect light.

For example, the spacer includes a first surface, a second surface, a third surface, and a fourth surface, the first surface is opposite to the second surface, the third surface is opposite to the fourth surface, the first surface is close to the optical waveguide, the second surface is close to the opposite substrate, and the third surface and the fourth surface are between the first surface and the second surface, the reflective element is on at least one of the third surface and the fourth surface.

For example, the reflective surface is inclined with respect to at least one of the optical waveguide and the opposite substrate.

For example, the reflective surface has an inclination angle of 9 to 13 degrees with respect to at least one of the optical waveguide and the opposite substrate.

For example, a size of the reflective element in a direction perpendicular to the optical waveguide is less than one half of a size of the spacer in the direction perpendicular to the optical waveguide.

For example, a size of the reflective element in a direction perpendicular to the optical waveguide is less than one third of a size of the spacer in the direction perpendicular to the optical waveguide.

For example, the display panel includes a plurality of sub-pixels, each of the plurality of sub-pixels includes a plurality of reflective elements, the plurality of reflective elements include two reflective elements having different inclination angles with respect to at least one of the optical waveguide and the opposite substrate.

For example, the display panel further includes a first alignment layer at a side of the optical waveguide close to the opposite substrate and a second alignment layer at a side of the opposite substrate close to the optical waveguide, the spacer is in contact with the first alignment layer and the second alignment layer, respectively.

For example, the display panel further includes a first electrode and a second electrode, the first electrode and the second electrode are configured to form an electric field to drive liquid crystal molecules to rotate; at least one of the first electrode and the second electrode is a slit electrode.

For example, the first electrode includes a plurality of first electrode strips, the second electrode includes a plurality of second electrode strips, an orthographic projection of the first electrode strips on the optical waveguide and an orthographic projection of the second electrode strips on the optical waveguide do not overlap; or, the first electrode is a plate-shaped electrode, and the second electrode is a slit electrode.

For example, one of the first electrode and the second electrode is arranged on the optical waveguide, and the other of the first electrode and the second electrode is arranged on the opposite substrate; or, the first electrode and the second electrode are both arranged on the optical waveguide or on the opposite substrate.

For example, the display panel further includes a light source, the light source is at least arranged at one side of the optical waveguide; the light source is configured to provide light propagating in the optical waveguide and being totally reflected.

At least one embodiment of the present disclosure further provides a display device, including any one of the display panel as described above.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

In order to make objectives, technical details and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative positional relationship, and in the case where the position of the described object is changed, the relative positional relationship may be changed accordingly.

Figure 1:
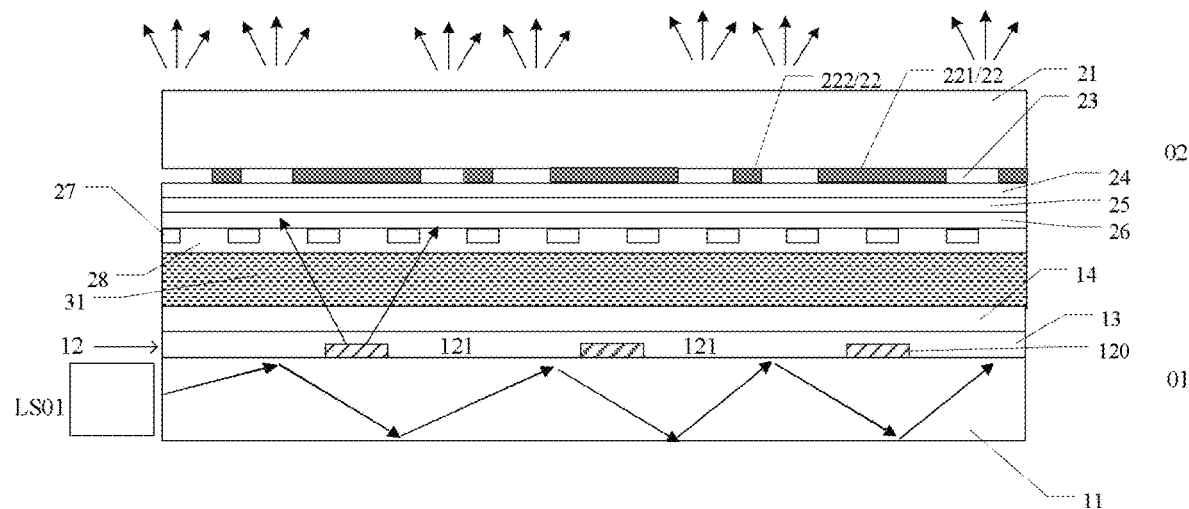
FIG. 1 is a sectional view of a directional liquid crystal display panel.

FIG. 1 is a sectional view of a directional liquid crystal display panel. As illustrated in FIG. 1, the liquid crystal display panel includes a first substrate 01, a second substrate 02 arranged opposite to the first substrate 01, and a liquid crystal layer 31 located between the first substrate 01 and the second substrate 02. The first substrate 01 and the second substrate 02 can be sealed to form a liquid crystal cell by a frame sealant located at the edge position, and the liquid crystal cell is filled with the liquid crystal layer 31 consisting of liquid crystal material. As illustrated in FIG. 1, the first substrate 01 includes an optical waveguide 11, a light source LS01 located at a side surface of the optical waveguide 11, a light extraction grating layer 12 located on a main surface of the optical waveguide 11, a filling layer 13 located on the light extraction grating layer 12, and a first alignment layer 14 located on the filling layer 13. The second substrate 02 includes a base substrate 21, a black matrix 22 located at a side of the base substrate 21 close to the first substrate 01, a color filter layer 23, a first insulating layer 24, a first electrode layer 25, a second insulating layer 26, a second electrode layer 27, and a second alignment layer 28. The first electrode layer 25 has a plate-shaped structure, and the second electrode layer 27 includes a plurality of slit electrodes. The black matrix 22 may include a first black matrix 221 and a second black matrix 222. The first black matrix 221 mainly plays the role of shading, and the second black matrix 222 can play the role of preventing color crosstalk.

As illustrated in FIG. 1, the light extraction grating layer 12 includes a plurality of light extraction gratings 120 and openings 121 between adjacent light extraction gratings 120, and the openings 121 are filled by the filling layer 13. The refractive index of the filling layer 13 is less than the refractive index of the optical waveguide 11. The light emitted from the light source LS01 propagates in the optical waveguide 11, and the light reaching a part of the optical waveguide 11 located at a position of the light extraction gratings 120 is extracted, and then can be incident on the second substrate 02, while the light reaching a part of the optical waveguide 11 located at a position of the openings 121 between the adjacent light extraction gratings 120 is totally reflected. The opening 121 between adjacent light extraction gratings 120 is the part between adjacent light extraction gratings 120 in FIG. 1.

The display principle of the display panel illustrated in FIG. 1 is as follows. The light exiting from the light extraction grating, for example, collimated light, is absorbed when entering the black matrix 22 of the second substrate 02, and there is no exiting light for display, which is in a dark state, and no electric field is applied to the liquid crystal layer at this time. When the display panel performs grayscale display, it is necessary to apply an electric field to the liquid crystal layer, at this time, the liquid crystal molecules present periodically arranged liquid crystal gratings, and the display is realized by diffraction/refraction of the liquid crystal gratings (forming lenses or prisms). For example, the collimated light exiting from the optical waveguide is diffracted/refracted by the liquid crystal grating and exiting from the area of openings between the black matrixes, to display gray scales such as L255. By controlling the electric field applied to the liquid crystal layer, the different diffraction/refraction efficiency of the liquid crystal lens on the incident light can be realized, thus realizing display of any gray scales such as gray scales from L0 to L255. For example, by applying voltages to the plate-shaped electrodes in the first electrode layer and the slit electrodes in the second electrode layer, an electric field for controlling the rotation of liquid crystal molecules in the liquid crystal layer is formed, and by controlling the magnitude of the electric field, the rotation degree of the liquid crystal molecules is controlled, thereby displaying different gray scales.

Figure 2:
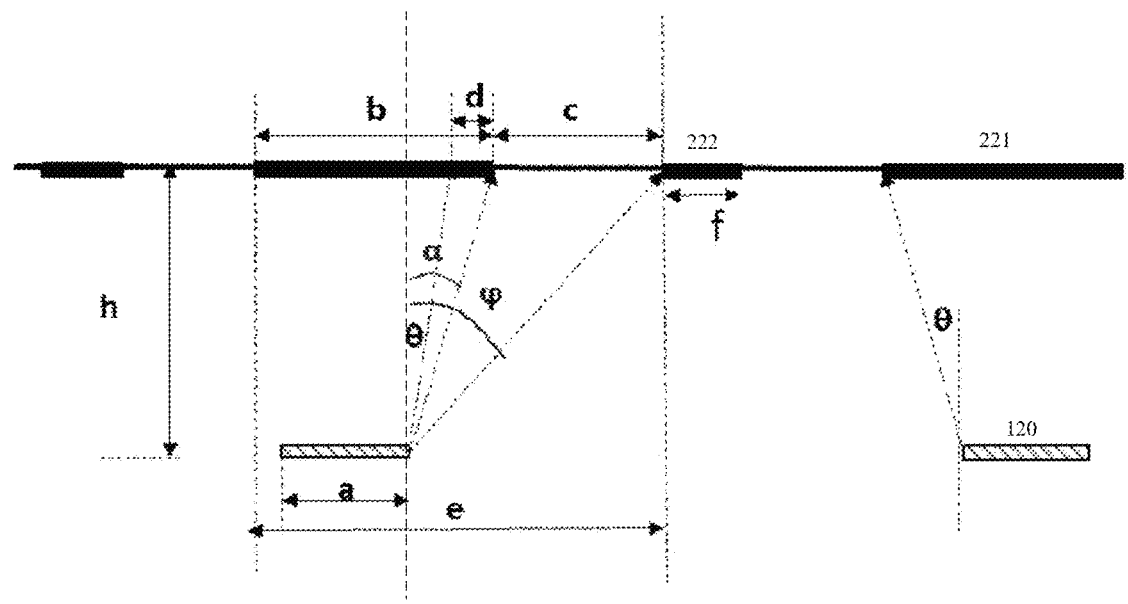
FIG. 2 is a schematic diagram of a width of a black matrix in a directional liquid crystal display panel illustrated in FIG. 1.

FIG. 2 is a schematic diagram of a width of a black matrix in a directional liquid crystal display panel illustrated in FIG. 1. FIG. 2 illustrates the first black matrix 221, the second black matrix 222 and the light extraction grating 120. α is a shading angle, θ is a light exiting angle, φ is a transmission angle, a is a width of the light extraction grating, e is a light extraction grating unit, b is a width of the first black matrix 221, c is a width of the transmission area, d is a process deviation, and f is a width of the second black matrix 222. When displaying black and white, there is no need to provide the second black matrix 222.

As illustrated in FIG. 2, in order to ensure no light leakage in the dark state, the width of the first black matrix 221 needs to satisfy the following formulas.

According to the geometric relationship:

$$b = a + (h*\tan\theta + d)*2 \qquad \text{Formula 1}$$

$$\alpha = \arctan\frac{\tan\theta*h + d}{h} \qquad \text{Formula 2}$$

$$\varphi = \arctan\left(\frac{c + h\tan\alpha}{h}\right) \qquad \text{Formula 3}$$

Knowing the grating width a, the light exiting angle θ, the height h and the process deviation d, the width b and the shading angle α of the first black matrix 221 can be obtained.

For example, the grating width a=10 μm, the light exiting angle is ±5°, the height is 160 μm, the process deviation d=5 μm, and it can be obtained that b=48 μm.

It can be seen that, because of the low collimation of the light source and the existence of process deviation, in order to ensure no light leakage in the dark state, the width of the first black matrix 221 needs to be made very large, which will limit the display resolution and pixel aperture ratio, and further affect the liquid crystal light efficiency and reduce the competitiveness. For example, the liquid crystal light efficiency of the display device including the display panel illustrated in FIG. 1 is about 1%.

Figure 3A:
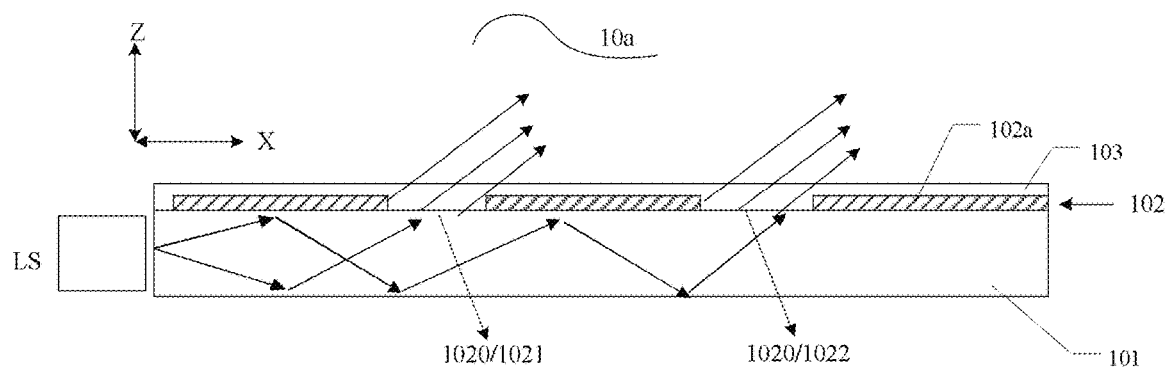
FIG. 3A is a sectional view of a display substrate provided by an embodiment of the present disclosure.

FIG. 3A is a sectional view of a display substrate provided by an embodiment of the present disclosure. As illustrated in FIG. 3A, the display substrate 10a includes an optical waveguide 101, a first buffer layer 102, and a second buffer layer 103. The first buffer layer 102 is located at a side of the optical waveguide 101, and includes a first buffer pattern 102a and a plurality of openings 1020 defined by the first buffer pattern 102a. The second buffer layer 103 is located at the side of the optical waveguide 101 provided with the first buffer layer 102, and at least covers the plurality of openings 1020. In FIG. 3A, the second buffer layer 103 completely covers the plurality of openings 1020 and has a portion beyond the first buffer layer 102. The refractive index of the first buffer pattern 102a is less than that of the optical waveguide 101, and the refractive index of the second buffer layer 103 is greater than that of the optical waveguide 101. For example, the larger the difference between the refractive index of the first buffer pattern 102a and the refractive index of the optical waveguide 101, the better. For example, the refractive index of the first buffer pattern 102a is in a range of 1.2-1.5, but it is not limited to this. For example, both the first buffer pattern 102a and the second buffer layer 103 can be made of insulating materials. For example, the first buffer pattern 102a and the second buffer layer 103 can be formed by using common materials meeting the above refractive index conditions, such as at least one of organic materials and inorganic materials, but are not limited thereto. For example, the organic material includes resin, but is not limited thereto. For example, the resin includes acrylic resin, but is not limited to this, and other suitable materials can be selected as required. For example, the inorganic material includes at least one selected from the group consisting of silicon oxide, silicon nitride, silicon oxynitride, aluminum oxide, and titanium oxide, but is not limited to this, and other suitable materials can also be selected as required. For example, the optical waveguide 101 can be made of materials such as glass or polymethyl methacrylate (PMMA), but is not limited to this.

Figure 3B:
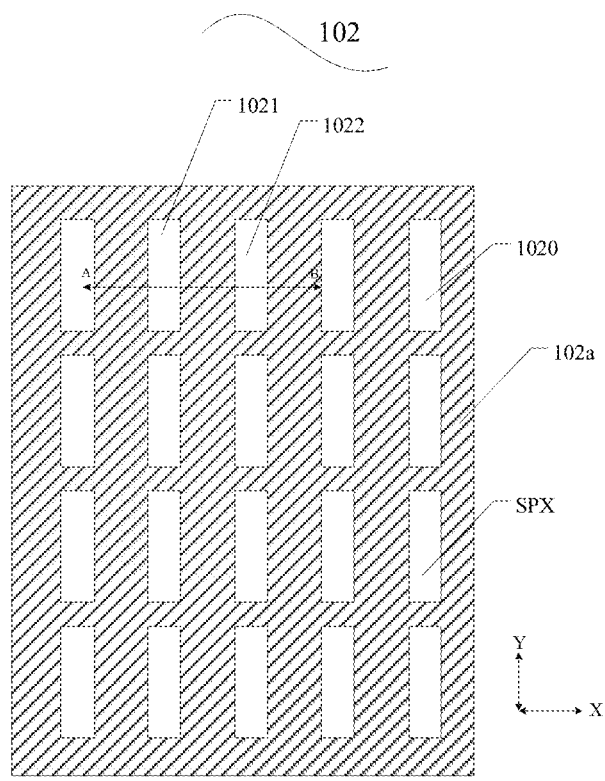
FIG. 3B is a schematic top view of a first buffer layer in FIG. 3A.

FIG. 3B is a schematic top view of the first buffer layer in FIG. 3A. FIG. 3A can be a sectional view of FIG. 3B taken along line A-B, but is not limited thereto. FIG. 3A also illustrates some structures except the first buffer layer. It should be noted that the schematic top view of the first buffer layer 102 illustrated in FIG. 3A is not limited to that illustrated in FIG. 3B. Each opening 1020 in FIG. 3B can correspond to one sub-pixel SPX. For example, the sub-pixel SPX is the smallest display unit that can be independently controlled. For example, the plurality of sub-pixels SPX may include red sub-pixels, green sub-pixels, and blue sub-pixels, but are not limited thereto.

As illustrated in FIG. 3A and FIG. 3B, the first buffer layer 102 includes a first opening 1021 and a second opening 1022.

For example, as illustrated in FIG. 3A and FIG. 3B, the first buffer layer 102 is formed of one material. The refractive index of the first buffer pattern 102a is the same at each position, but embodiments of the present disclosure are not limited thereto.

Figure 3C:
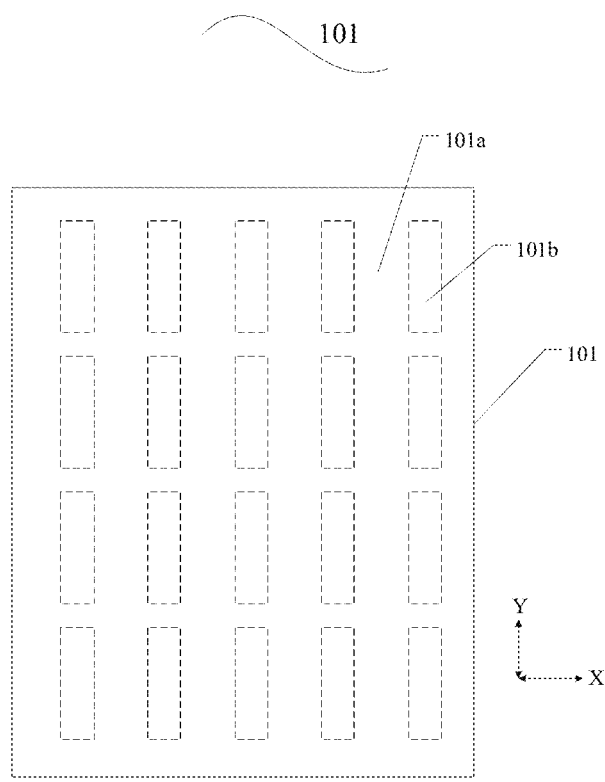
FIG. 3C is a schematic top view of an optical waveguide in FIG. 3A.

FIG. 3C is a schematic top view of the optical waveguide in FIG. 3A. Referring to FIG. 3A and FIG. 3C, the optical waveguide 101 includes a first portion 101a and a second portion 101b, the first portion 101a is located at the position of the first buffer pattern 102a and the second portion 101b is located at the position of the plurality of openings 1020. According to the refractive index relationship between the optical waveguide 101 and the first buffer pattern 102a, it can be seen that the first portion 101a is configured to allow the light which propagates in the optical waveguide 101 and irradiates on the first portion 101a to be totally reflected. According to the refractive index relationship between the optical waveguide 101 and the second buffer layer 103, the second portion 101b is configured to allow the light which propagates in the optical waveguide 101 and irradiates on the second portion 101b to exit.

The display substrate provided by this embodiment of the present disclosure can reduce the manufacturing difficulty, can improve the liquid crystal light efficiency of the display device including the display substrate by 5-6 times, and can increase the market competitiveness. For example, the liquid crystal light efficiency (light exiting efficiency) of the display device including the display substrate provided by this embodiment of the present disclosure can reach 5% or more.

Figure 3D:
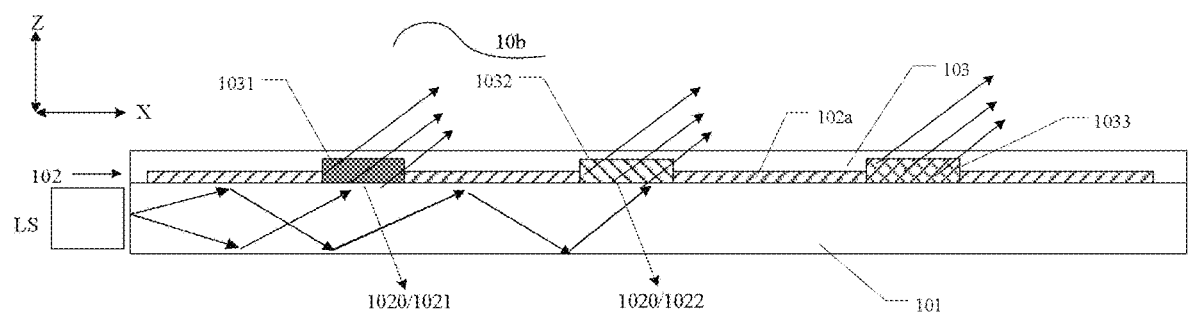
FIG. 3D is a sectional view of another display substrate provided by another embodiment of the present disclosure.

FIG. 3D is a sectional view of another display substrate provided by another embodiment of the present disclosure. As illustrated in FIG. 3D, the display substrate 10b is different from the display substrate 10a in that the second buffer layer 103 includes a plurality of buffer portions, each of the plurality of buffer portions fills an opening 1020, and the plurality of buffer portions have different refractive indices. FIG. 3D illustrates a first buffer portion 1031, a second buffer portion 1032, and a third buffer portion 1033, and every two of the first buffer portion 1031, the second buffer portion 1032, and the third buffer portion 1033 have different refractive indices. For example, the first buffer portion 1031, the second buffer portion 1032, and the third buffer portion 1033 may correspond to sub-pixels of different colors, respectively.

FIG. 3A and FIG. 3D illustrate a first direction X and a third direction Z, and FIG. 3B and FIG. 3C illustrate a first direction X and a second direction Y. For example, the first direction X and the second direction Y are directions parallel with the surface of the optical waveguide 101. The first direction X intersects with the second direction Y. For further example, the first direction X is perpendicular to the second direction Y. For example, the third direction Z is a direction perpendicular to the optical waveguide 101. The surface of the optical waveguide 101 is a surface on which the first buffer layer 102 and the second buffer layer 103 are provided. For example, the third direction Z is perpendicular to the first direction X and perpendicular to the second direction Y.

Figure 4A:
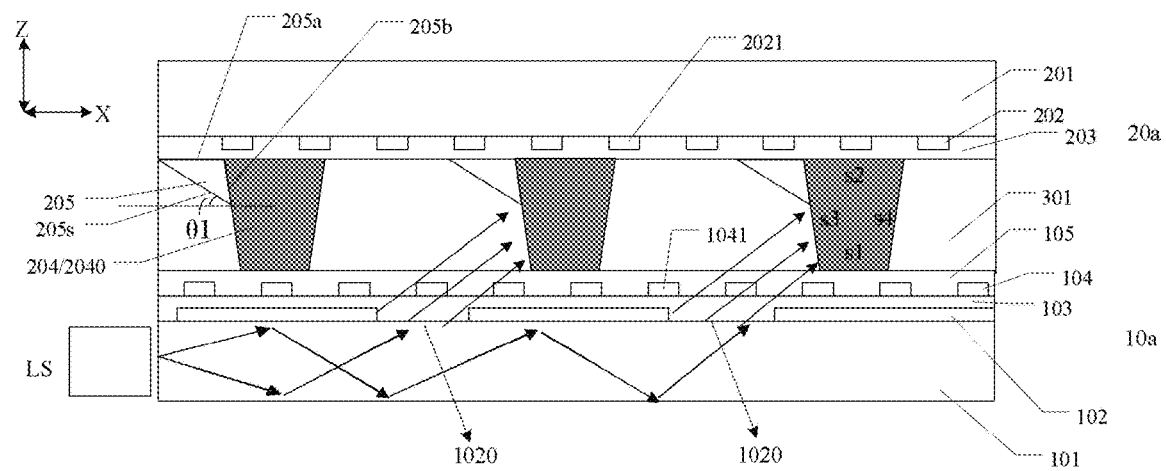
FIG. 4A is a sectional view of a display panel provided by an embodiment of the present disclosure.

FIG. 4A is a sectional view of a display panel provided by an embodiment of the present disclosure. As illustrated in FIG. 4A, the display panel includes the display substrate illustrated in FIG. 3A. Of course, the display panel provided by the embodiment of the present disclosure can include any of the above-mentioned display substrates.

For example, as illustrated in FIG. 4A, the display panel provided by the embodiment of the present disclosure includes a display substrate 10a illustrated in FIG. 3A and an opposite substrate 20a opposite to the display substrate 10a. The display substrate 10a and the opposite substrate 20a are sealed to form a cell, a spacer pattern 204 is arranged in the cell, and the spacer pattern 204 includes a plurality of spacers 2040, a space between adjacent spacers 2040 is filled with a liquid crystal material, and each of the plurality of spacers 2040 is configured to keep a thickness of the cell and absorb light irradiated thereon. For example, the spacer pattern 204 can be formed of a common material with light absorption performance, for example, it can be made of the same material as the black matrix in the common technology, but is not limited thereto.

For example, as illustrated in FIG. 4A, in order to facilitate light incident on the spacers 2040, a size of the space between adjacent spacers 2040 in the direction parallel with the optical waveguide 101 is greater than a size of the opening 1020 in the direction parallel with the optical waveguide 101. For example, the size of the space between adjacent spacers 2040 in a horizontal direction is greater than the size of the opening 1020 in the horizontal direction. For example, as illustrated in FIG. 4A, the direction parallel with the optical waveguide 101 includes the first direction X, but is not limited thereto.

For example, as illustrated in FIG. 4A, in order to make the size of the space between adjacent spacers in the horizontal direction greater than the size of the opening 1020 between adjacent spacers in the horizontal direction, an orthographic projection of the spacers 2040 on the optical waveguide 101 falls within an orthographic projection of the first buffer pattern 102a on the optical waveguide 101. For example, as illustrated in FIG. 4A, the orthographic projection of the opening 1020 on the optical waveguide 101 falls within the orthographic projection of the space between two spacers 2040 adjacent to the opening on the optical waveguide 101. For example, as illustrated in FIG. 4A, the orthographic projection of the spacer 2040 on the optical waveguide 101 does not overlap with the orthographic projection of the opening 1020 on the optical waveguide 101.

For example, as illustrated in FIG. 4A, the display panel further includes a reflective element 205, which is located at a side of the spacer 2040 close to the opposite substrate 20a, and the reflective element 205 has a reflective surface 205s configured to reflect light irradiated thereon. For example, the reflective element 205 can be made of a metal material, but is not limited thereto. The reflective element 205 can be a structure formed of resin, on which a reflective surface made of metal material is formed by a vapor-deposition process.

For example, as illustrated in FIG. 4A, the spacer 2040 includes a first surface s1, a second surface s2, a third surface s3, and a fourth surface s4. The first surface s1 is close to the optical waveguide 101 and the second surface s2 is away from the optical waveguide 101, that is, the second surface s2 is close to the opposite substrate. The third surface s3 and the fourth surface s4 are located between the first surface s1 and the second surface s2. The first surface s1 is opposite to the second surface s2, and the third surface s3 is opposite to the fourth surface s4. The reflective element 205 is located on at least one of the third surface s3 and the fourth surface s4. FIG. 4A illustrates an example in which the reflective element 205 is only located on the third surface s3.

For example, as illustrated in FIG. 4A, the reflective surface 205s is inclined with respect to at least one of the optical waveguide 101 and the opposite substrate 20a. FIG. 4A illustrates an example in which the reflective surface 205s is inclined with respect to both the optical waveguide 101 and the opposite substrate 20a.

For example, as illustrated in FIG. 4A, an inclination angle θ1 of the reflective surface 205s with respect to at least one of the optical waveguide 101 and the opposite substrate 20a is from 9 degrees to 13 degrees.

For example, as illustrated in FIG. 4A, a size of the reflective element 205 in the direction perpendicular to the optical waveguide 101 is less than one half of a size of the spacer 2040 in the direction perpendicular to the optical waveguide 101. For example, the direction perpendicular to the optical waveguide 101 is the third direction Z.

For example, in other embodiments, in order to increase the area of the reflective surface, the size of the reflective element 205 in the direction perpendicular to the optical waveguide 101 is less than one third of the size of the spacer 2040 in the direction perpendicular to the optical waveguide 101. For example, the direction perpendicular to the optical waveguide 101 is the third direction Z.

For example, as illustrated in FIG. 4A, the display panel further includes a first alignment layer 105 at the side of the optical waveguide 101 close to the opposite substrate 20a and a second alignment layer 203 at the side of the opposite substrate 20a close to the optical waveguide 101, in order to avoid light leakage and color crosstalk, the spacer 2040 is in contact with the first alignment layer 105 and the second alignment layer 203, respectively.

For example, the display panel further includes a first electrode and a second electrode, the first electrode and the second electrode are configured to form an electric field to drive the liquid crystal molecules to rotate and at least one of the first electrode and the second electrode is a slit electrode. As illustrated in FIG. 4A, the display panel includes a first electrode 104 and a second electrode 202, the first electrode 104 is located at the side of the optical waveguide close to the opposite substrate 20a, and the second electrode 202 is located at the side of the base substrate 201 close to the display substrate 10a, both the first electrode 104 and the second electrode 202 are slit electrodes. The first electrode 104 and the second electrode 202 may be made of a transparent material, for example, it can be made of a transparent oxide such as indium tin oxide, but not limited thereto.

The realization principle of gray scale of the display panel provided by the embodiment of the present disclosure is as follows: the efficiency of the liquid crystal dimming unit (sub-pixel) can be realized by adjusting the magnitudes of the voltages applied to the first electrode and the second electrode, thereby realizing different gray scales. The first electrode 104 and the second electrode 202 can be provided for each liquid crystal dimming unit, the plurality of first electrodes 104 in the plurality of sub-pixels are insulated from each other to be applied with signals, respectively, and the plurality of second electrodes 202 in the plurality of sub-pixels can be electrically connected to each other to be applied with the same signal.

For example, as illustrated in FIG. 4A, the first electrode 104 includes a plurality of first electrode strips 1041, and the second electrode 202 includes a plurality of second electrode strips 2021, and the orthographic projection of the first electrode strips 1041 and the orthographic projection of the second electrode strips 2021 on the optical waveguide 101 do not overlap.

For example, one of the first electrode 104 and the second electrode 202 is arranged on the optical waveguide 101, and the other of the first electrode 104 and the second electrode 202 is arranged on the opposite substrate 20a. As illustrated in FIG. 4A, the first electrode 104 is located on the optical waveguide, and the second electrode 202 is located on the base substrate 201 of the opposite substrate 20a. Of course, in other embodiments, both the first electrode 104 and the second electrode 202 can be arranged on the optical waveguide 101, or both the first electrode 104 and the second electrode 202 can be arranged on the opposite substrate 20a.

For example, as illustrated in FIG. 4A, the light source LS is at least arranged at one side of the optical waveguide 101; the light source LS is configured to provide light that propagates in the optical waveguide 101 and can be totally reflected. For example, the light source LS can be white light or monochromatic light. For example, the light exiting angle of the light source LS has certain requirements, which is greater than the critical angle of total reflection of the optical waveguide.

For example, as illustrated in FIG. 4A, the reflective element 205 is in contact with the spacer 2040, but is not limited thereto. In other embodiments, the reflective element 205 can be not in contact with the spacers 2040, that is, the reflective element 205 can be located between two adjacent spacers 2040 and not in contact with either spacer 2040, so that the whole side surface, such as the whole third surface s3, of the spacers 2040 can absorb light.

FIG. 4A is an optical path diagram when no electric field is formed between the first electrode and the second electrode. In FIG. 4A, there is no voltage difference and no electric field between the first electrode 104 and the second electrode 202, the light exiting from the opening 1020 irradiates on the spacer 2040 and is absorbed by the spacer 2040, the display panel is in a dark state.

Figure 4B:
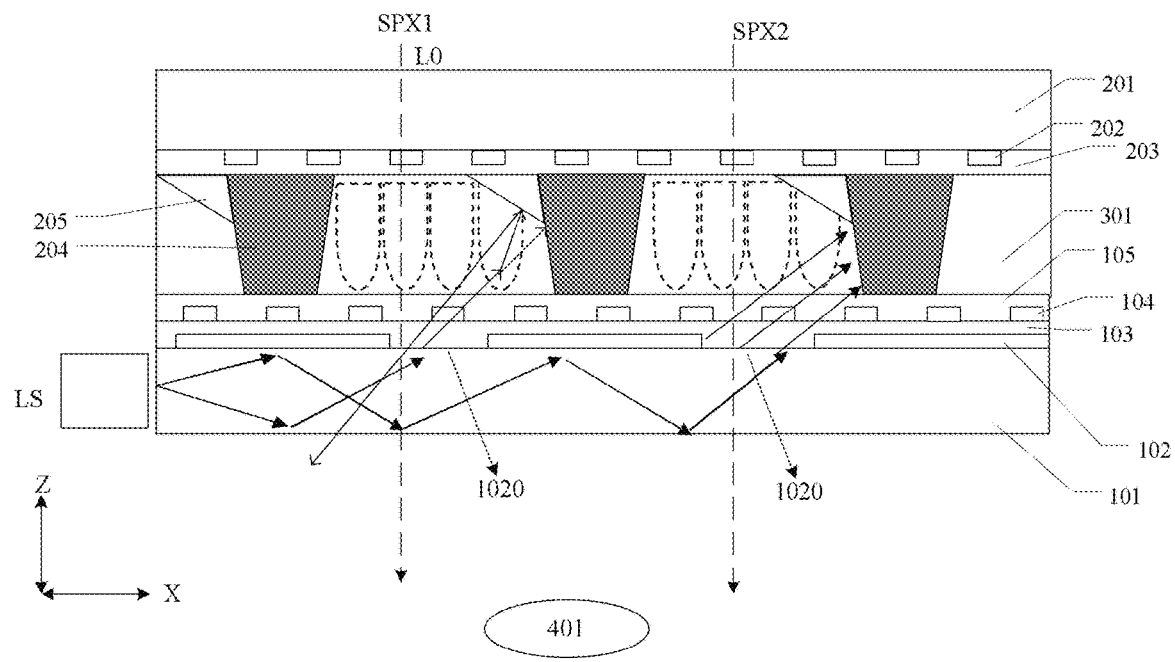
FIG. 4B is an optical path diagram when an electric field is formed between a first electrode and a second electrode in a display panel provided by an embodiment of the present disclosure.

FIG. 4B is an optical path diagram when an electric field is formed between the first electrode and the second electrode. There is a voltage difference between the first electrode 104 and the second electrode 202, which forms an electric field and can drive the liquid crystal molecules to rotate, so that the light irradiated on the liquid crystal molecules is refracted so as to be adjusted to be incident on the reflective surface 205s, and the light incident on the reflective surface 205s can be reflected so as to exit from the opening 1020, thereby realizing display.

The realization of displaying gray scale will be described in detail below.

To realize a dark state, the light emitted from the light source is incident into the optical waveguide for total reflection and propagates in the optical waveguide at positions corresponding to the area of the first buffer layer where the openings are not located, at the position of the optical waveguide corresponding to the opening, because the refractive index of the second buffer layer is greater than that of the optical waveguide, the light can go out here, and the exiting light passes through each film layer and is finally absorbed by a side of the spacer to realize the dark state.

To realize a bright state, it is necessary to apply an electric field for the liquid crystal molecules, that is, to apply driving voltages to the first electrode and the second electrode, respectively, so that the liquid crystal molecules can rotate to form a liquid crystal grating or lens, which can scatter the incident light to change the light angle, and the modulation angle is related to the period of the liquid crystal grating. For example, in the case where the period of the liquid crystal grating P is 3 µm, the modulation ability is about 20 degrees, and at this time, after the incident angle is modulated by 20 degrees, the light penetrates the liquid crystal layer and enters the obliquely arranged reflective surface, and then returns to the liquid crystal layer after being reflected by the reflective surface, and finally penetrates the optical waveguide for exiting to realize display.

In this embodiment of the present disclosure, the modulation ability of the liquid crystal grating can be controlled by the magnitude of the applied voltage, that is, the direction of the light is controlled to be incident on the reflective surface from being incident on the spacer. By adjusting the electric field applied to the liquid crystal layer, different display gray scales can be realized. The higher the electric field, the higher the height of the liquid crystal grating and the stronger the modulation ability. In this embodiment of the present disclosure, by providing the reflective surface, the light angle can be further adjusted, and the angle of the incident light can be adjusted to deviate from the total reflection angle, so that the incident light can go out from the optical waveguide layer to achieve the effect of increasing the light exiting efficiency.

For example, as illustrated in FIG. 4B, in the case where the display panel is a transparent display panel, the background light LO can reach the human eye 401 through the opening, so that the human eye 401 can also observe the actual scene through the display panel. Of course, in some embodiments, the human eye 401 can only observe the display image of the display panel without observing the actual scene, which is not limited by the embodiments of the present disclosure. As illustrated in FIG. 4B, the side of the display panel where the optical waveguide 101 is located is the display surface.

As illustrated in FIG. 4A and FIG. 4B, the display panel provided by the embodiment of the present disclosure does not need to be provided with a polarizer, thereby simplifying the manufacturing process, reducing the cost, facilitating mass production and reducing the thickness of the display panel.

As illustrated in FIG. 4A and FIG. 4B, two sub-pixels are illustrated: a sub-pixel SPX1 and a sub-pixel SPX2. For example, in this embodiment of the present disclosure, a color filter layer can also be arranged at the side of the optical waveguide 101 away from the opposite substrate 20a to realize color display.

As illustrated in FIG. 4A and FIG. 4B, the display panel further includes a liquid crystal layer 301 located between the display substrate 10a and the opposite substrate 20a. The liquid crystal layer 301 is configured to form a liquid crystal grating/lens for modulating the direction/angle of incident light during display. In the display panel provided by the embodiment of the present disclosure, the same as the reflection mode, when a voltage is applied, the liquid crystal layer forms a liquid crystal grating/lens, and the light originally incident on the spacer is adjusted to be incident on the reflective surface, so as to realize the emission from the opening. As illustrated in FIG. 4A and FIG. 4B, the first electrode and the second electrode are respectively arranged at two sides of the liquid crystal layer to form a vertical electric field, or the electric field has a vertical component.

The display panel provided by this embodiment of the present disclosure can realize gray-scale display by controlling the light direction. According to the display panel provided by the embodiment of the present disclosure, there is no light extraction structure in the form of gratings, the light in the optical waveguide is transmitted to each pixel by total reflection, and the display panel is provided with a light extraction opening for light extraction; the light is blocked by spacers to realize the dark state, and the electric field is used to control the liquid crystal molecules so that the light is refracted to the reflective surface to realize the bright state. According to the display panel provided by the embodiment of the present disclosure, the alignment size is supplemented in the vertical direction, the projection area of large-angle total reflection rays in the propagation direction is small, the area needed to be shaded is small, and the aperture ratio can be greatly improved.

Figure 4C:
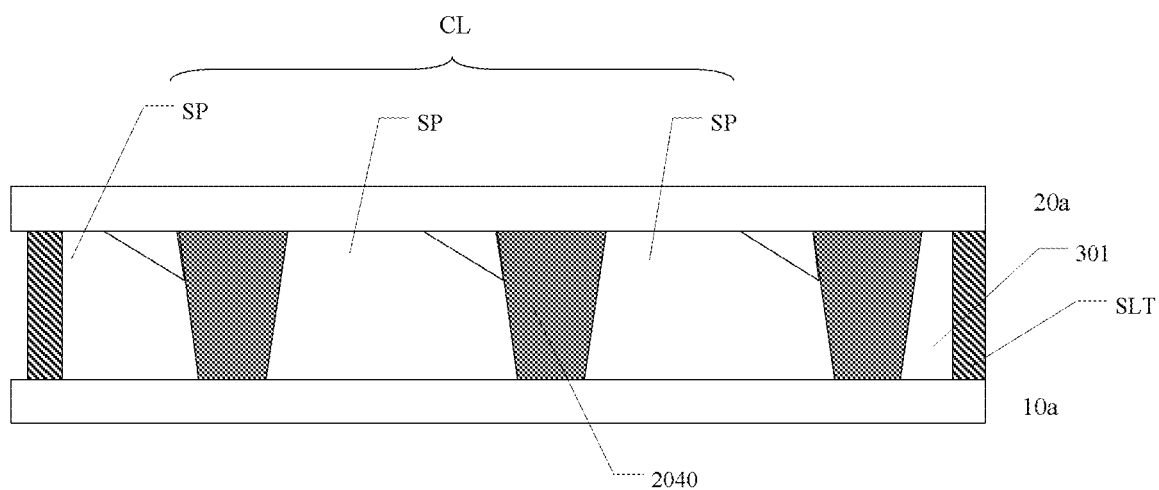
FIG. 4C is a sectional view of a display panel provided by an embodiment of the present disclosure.

FIG. 4C is a sectional view of a display panel provided by an embodiment of the present disclosure. As illustrated in FIG. 4C, the display substrate 10a and the opposite substrate 20a are sealed to form a liquid crystal cell CL by a frame sealant SLT located at the edge positions of the display substrate 10a and the opposite substrate 20a. For example, as illustrated in FIG. 4C, the size of the spacer 2040 in the direction perpendicular to the display panel 10a is equal to the size of the frame sealant SLT in the direction perpendicular to the display panel 10a. For example, in this embodiment of the present disclosure, the liquid crystal cell CL includes a plurality of spaces SP. Each space is surrounded by adjacent spacers 2040. For example, each space SP is an independent space. Only three spaces SP are illustrated in FIG. 4C, and the number of spaces SP can be determined as required. For example, one space SP corresponds to one sub-pixel SPX (as illustrated in FIG. 3B).

Figure 5:
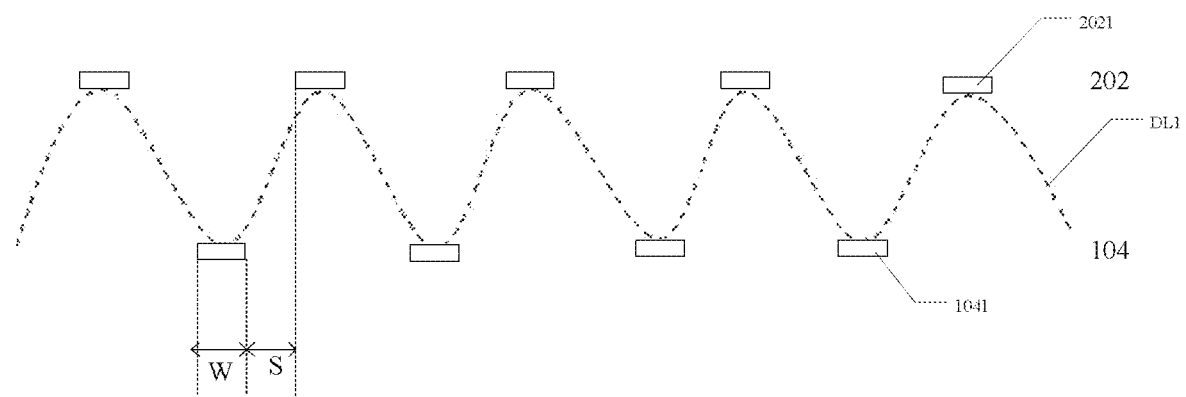
FIG. 5 is a schematic diagram of an electric field formed by a first electrode and a second electrode in a display panel provided by an embodiment of the present disclosure.

FIG. 5 is a schematic diagram of an electric field formed by a first electrode and a second electrode in a display panel provided by an embodiment of the present disclosure. For example, FIG. 5 is a schematic diagram of the electric field formed by the first electrode 104 and the second electrode 202 in the display panel illustrated in FIG. 4A. The electric field line DL1 is illustrated in FIG. 5.

As illustrated in FIG. 5, a width of the electrode strip is W, and a distance between adjacent electrode strips is S. The period of the electrode is the sum of W and S. The period of the liquid crystal grating is the same as that of the electrode.

Figure 6:
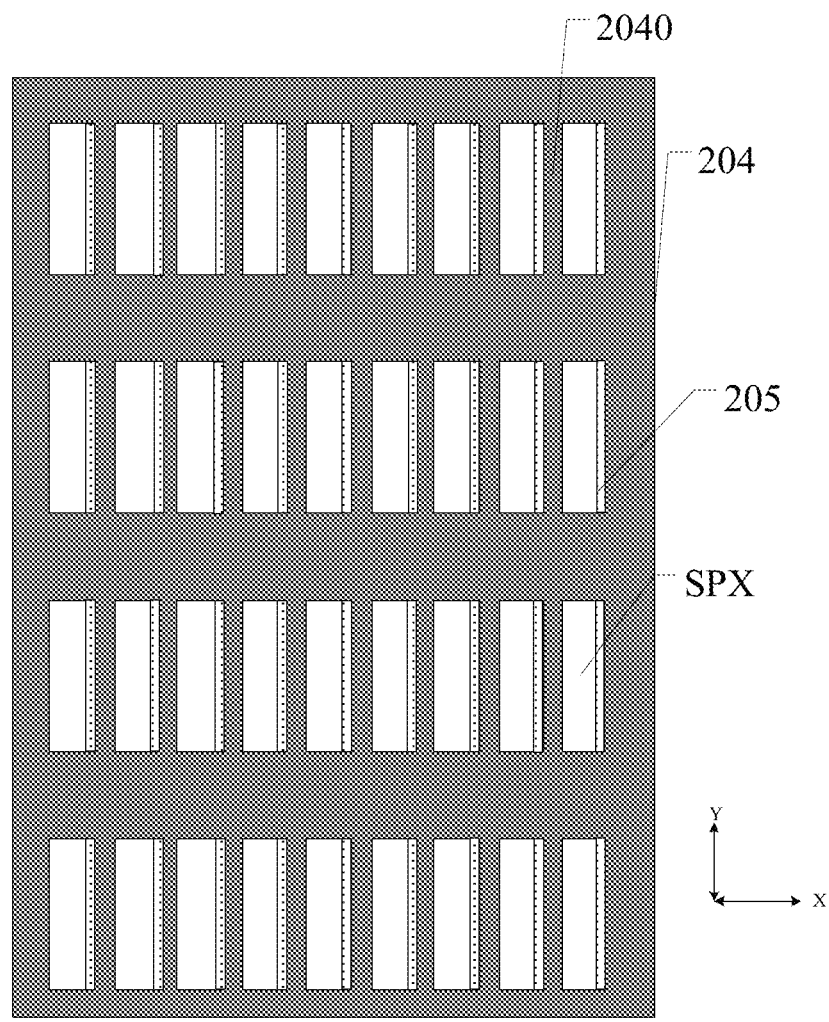
FIG. 6 is a top view of a spacer pattern and a reflective element in a display panel provided by an embodiment of the present disclosure.

FIG. 6 is a top view of a spacer pattern and a reflective element in a display panel provided by an embodiment of the present disclosure. As illustrated in FIG. 6, one side of the spacer 2040 is provided with a reflective element 205. FIG. 6 can be a top view of the spacer pattern and reflective elements in the display panel illustrated in FIG. 4A.

Figure 7:
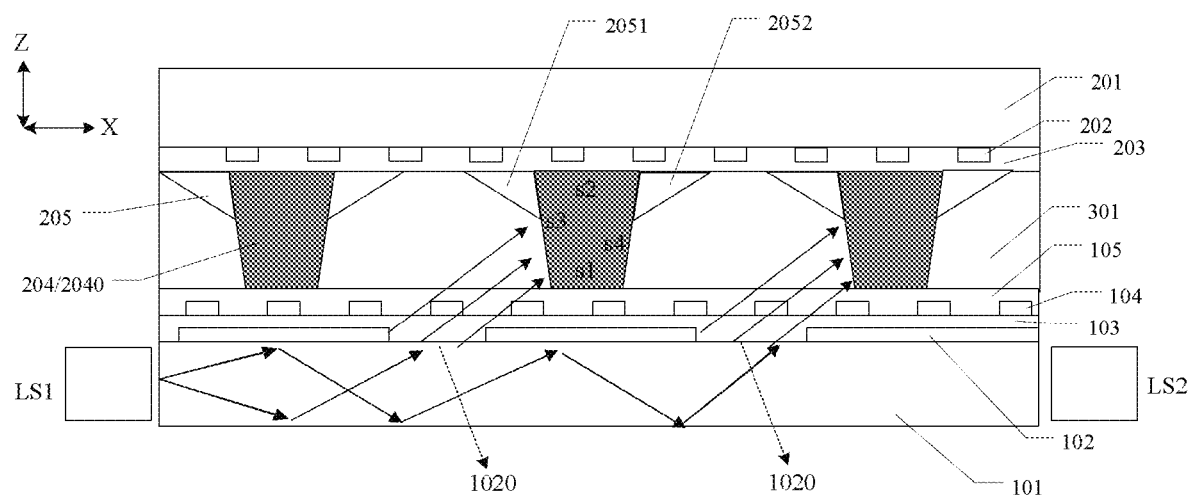
FIG. 7 is a sectional view of another display panel provided by another embodiment of the present disclosure.

FIG. 7 is a sectional view of another display panel provided by another embodiment of the present disclosure. Compared with the display panel illustrated in FIG. 3A, the display panel illustrated in FIG. 7 is provided with reflective elements at two sides of the spacer 2040. As illustrated in FIG. 7, a first reflective element 2051 is provided on the third surface s3 of the spacer 2040 and a second reflective element 2052 is provided on the fourth surface s4 of the spacer 2040, so that the brightness can be improved and the display effect can be improved.

Figure 8:
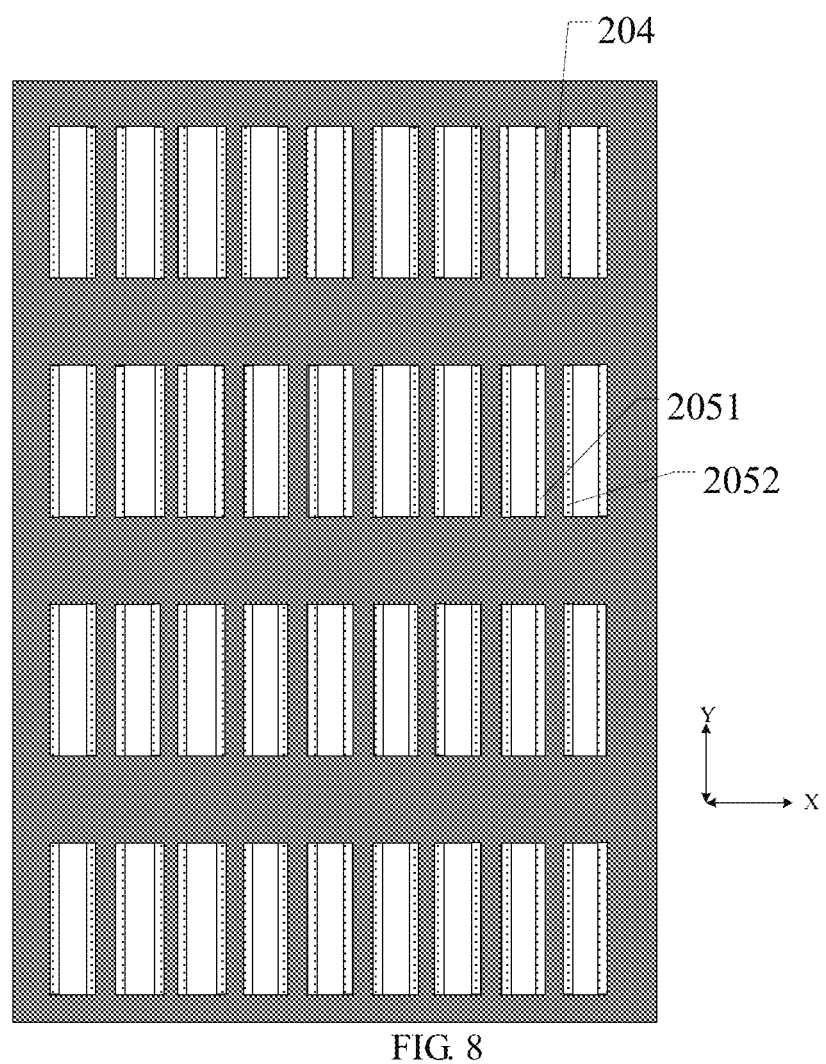
FIG. 8 is a top view of a spacer pattern and a reflective element in a display panel provided by an embodiment of the present disclosure.

FIG. 8 is a top view of a spacer pattern and a reflective element in a display panel provided by an embodiment of the present disclosure. For example, FIG. 8 is a top view of the spacer pattern and the reflective element in the display panel illustrated in FIG. 7.

Figure 9:
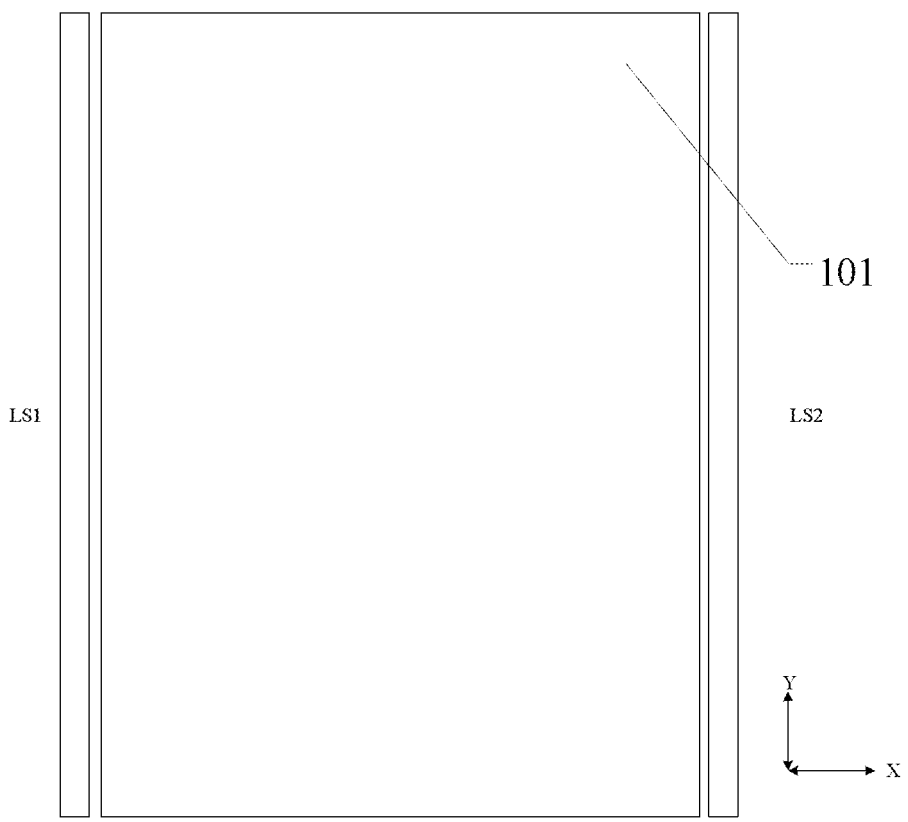
FIG. 9 is a top view of an optical waveguide and a light source in a display panel provided by an embodiment of the present disclosure.

FIG. 9 is a top view of an optical waveguide and a light source in a display panel provided by an embodiment of the present disclosure. For example, FIG. 9 is a top view of the optical waveguide and the light source in the display panel illustrated in FIG. 7. As illustrated in FIG. 9, a first light source LS1 and a second light source LS2 are provided at the left and right sides of the optical waveguide 101, respectively. Referring to FIG. 7 to FIG. 9, light emitted from the first light source LS1 can be reflected by the first reflective element 2051, and light emitted from the second light source LS2 can be reflected by the second reflective element 2052.

Figure 10:
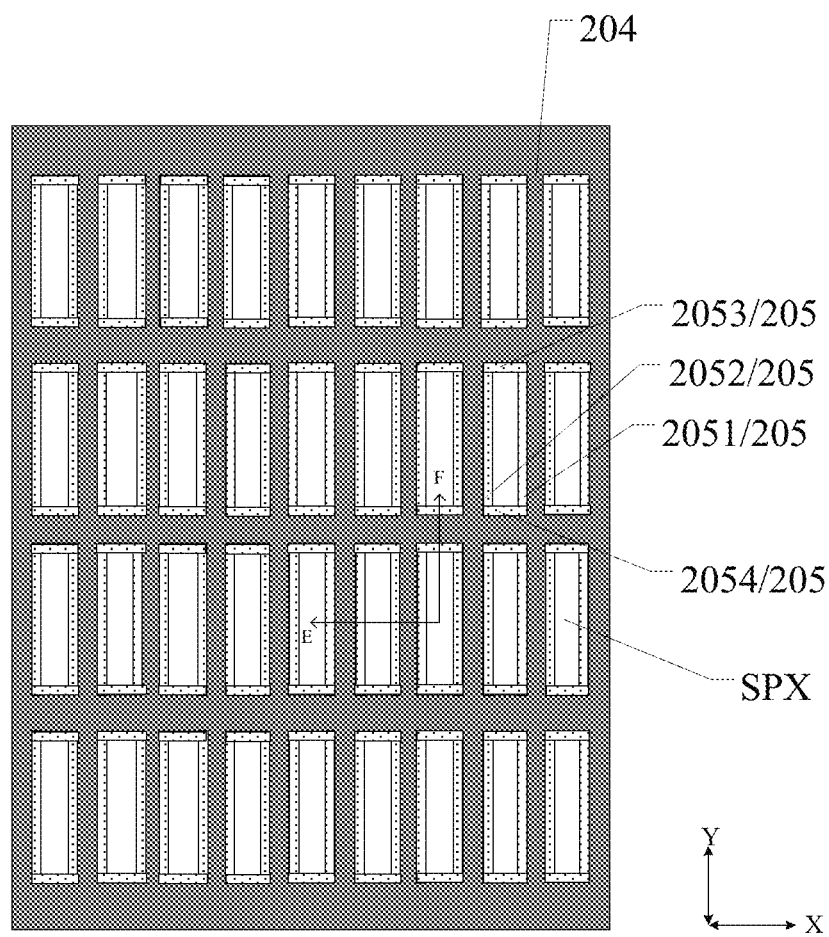
FIG. 10 is a top view of a spacer pattern and a reflective element in another display panel provided by another embodiment of the present disclosure.

FIG. 10 is a top view of a spacer pattern and a reflective element in another display panel provided by another embodiment of the present disclosure. For example, as illustrated in FIG. 10, the display panel includes a plurality of sub-pixels SPX, and each sub-pixel SPX includes a plurality of reflective elements 205. As illustrated in FIG. 10, each sub-pixel SPX includes four reflective elements 205: a first reflective element 2051, a second reflective element 2052, a third reflective element 2053, and a fourth reflective element 2054. For example, the first reflective element 2051, the second reflective element 2052, the third reflective element 2053, and the fourth reflective element 2054 can be formed of the same material by the same patterning process, but are not limited thereto. For example, the first reflective element 2051, the second reflective element 2052, the third reflective element 2053, and the fourth reflective element 2054 are integrally formed, but are not limited thereto.

Figure 11:
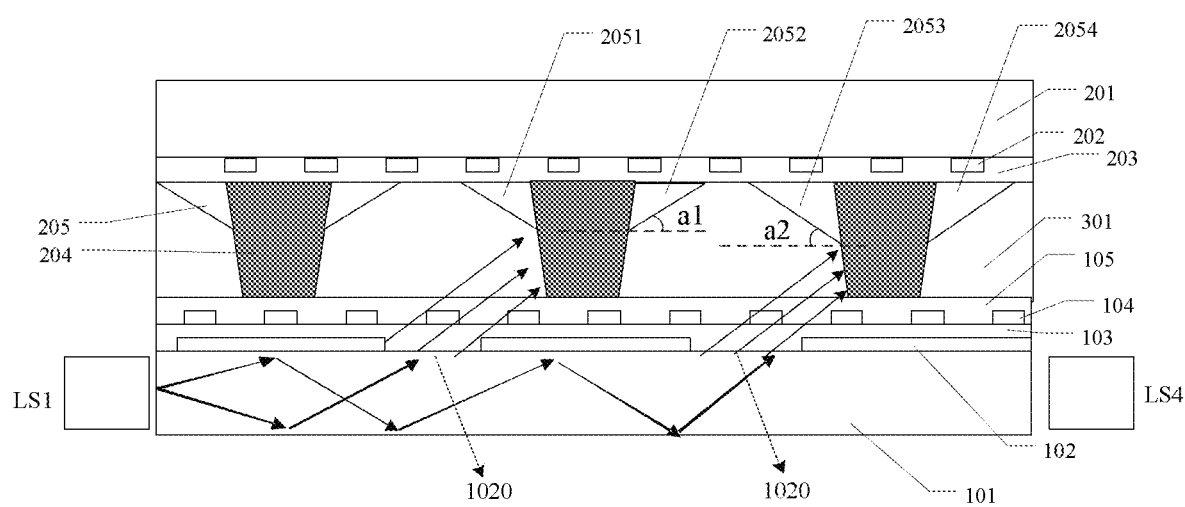
FIG. 11 is a sectional view of a display panel provided by an embodiment of the present disclosure.

FIG. 11 is a sectional view of a display panel provided by an embodiment of the present disclosure. For example, FIG. 11 can be a sectional view of FIG. 10 taken along line E-F. For example, the plurality of reflective elements 205 include two reflective elements 205 having different inclination angles with respect to at least one of the optical waveguide 101 and the opposite substrate 20a. As illustrated in FIG. 11, the inclination angles of the first reflective element 2051 and the second reflective element 2052 are the same, and can be a first inclination angle a1. The inclination angles of the third reflective element 2053 and the fourth reflective element 2054 are the same, and can be a second inclination angle a2. For example, the first inclination angle a1 is different from the second inclination angle a2. For example, the first inclination angle a1 is greater than the second inclination angle a2, but is not limited thereto. In other embodiments, the first inclination angle a1 can be less than or equal to the second inclination angle a2, and the relationship between the first inclination angle a1 and the second inclination angle a2 can be determined as required.

Figure 12:
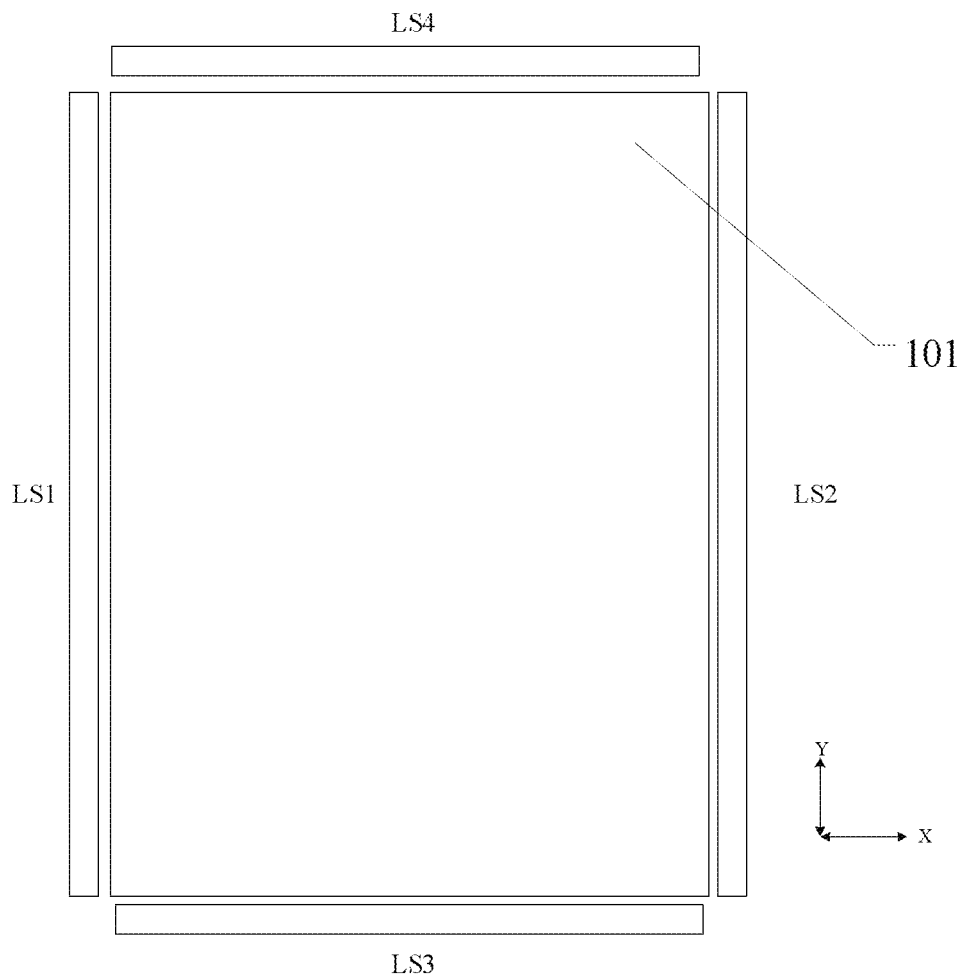
FIG. 12 is a top view of an optical waveguide and a light source in a display panel provided by an embodiment of the present disclosure.

FIG. 12 is a top view of an optical waveguide and a light source in a display panel provided by an embodiment of the present disclosure. As illustrated in FIG. 12, a first light source LS1, a second light source LS2, a third light source LS3, and a fourth light source LS4 are provided at the left, right, lower and upper sides of the optical waveguide 101, respectively. For example, light emitted from the first light source LS1 can be reflected by the first reflective element 2051, light emitted from the second light source LS2 can be reflected by the second reflective element 2052, light emitted from the third light source LS3 can be reflected by the third reflective element 2053, and light emitted from the fourth light source LS4 can be reflected by the fourth reflective element 2054.

Figure 13A:
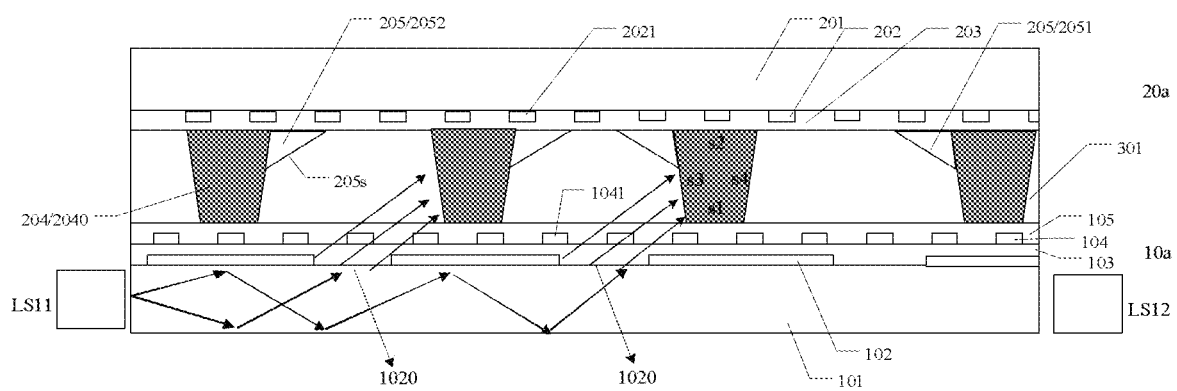
FIG. 13A is a sectional view of a display panel provided by another embodiment of the present disclosure.

FIG. 13A is a sectional view of a display panel provided by another embodiment of the present disclosure. As illustrated in FIG. 13A, in order to facilitate the observer's viewing, the reflective element 205 includes a first reflective element 2051 and a second reflective element 2052. The first reflective element 2051 is located on the third surface s3 of the spacer 2040, and the second reflective element 2052 is located on the fourth surface s4 of the spacer 2040. FIG. 13A further illustrates the first light source LS11 and the second light source LS12. The first light source LS11 and the second light source LS12 are arranged at opposite sides of the optical waveguide 101.

Figure 13B:
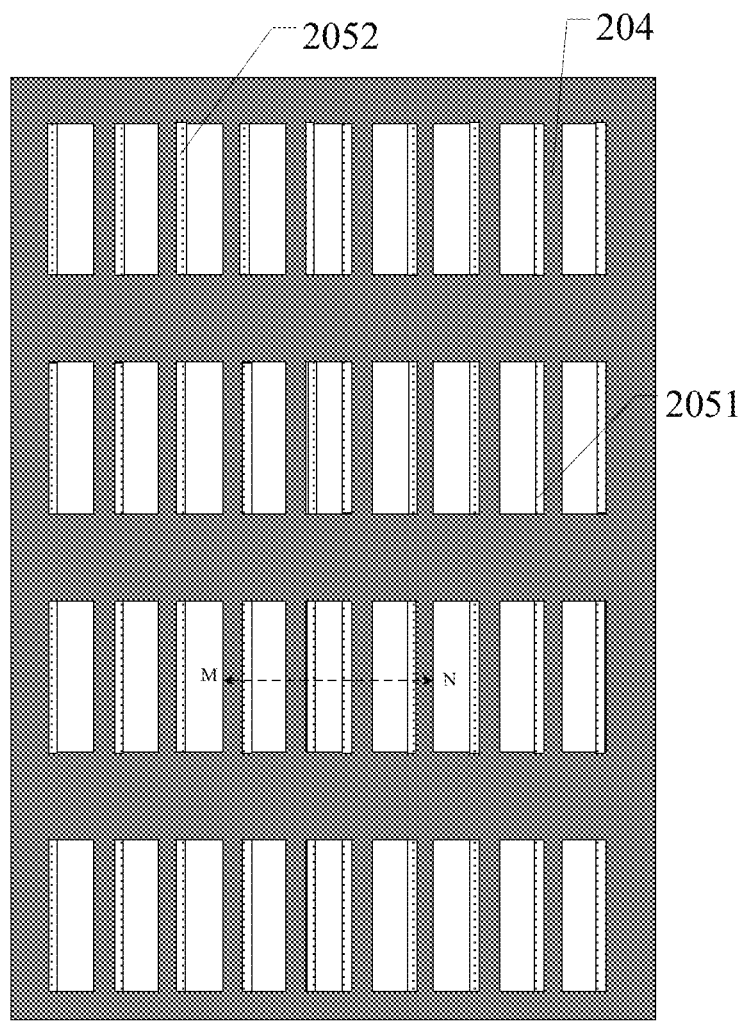
FIG. 13B is a top view of a spacer pattern and a reflective element in a display panel provided by an embodiment of the present disclosure.

FIG. 13B is a top view of a spacer pattern and reflective elements in a display panel provided by an embodiment of the present disclosure. For example, FIG. 13A can be a sectional view of FIG. 13B taken along line M-N. As illustrated in FIG. 13B, the plurality of first reflective elements 2051 and the plurality of second reflective elements 2052 can be symmetrical with respect to a symmetry axis.

Figure 14A:
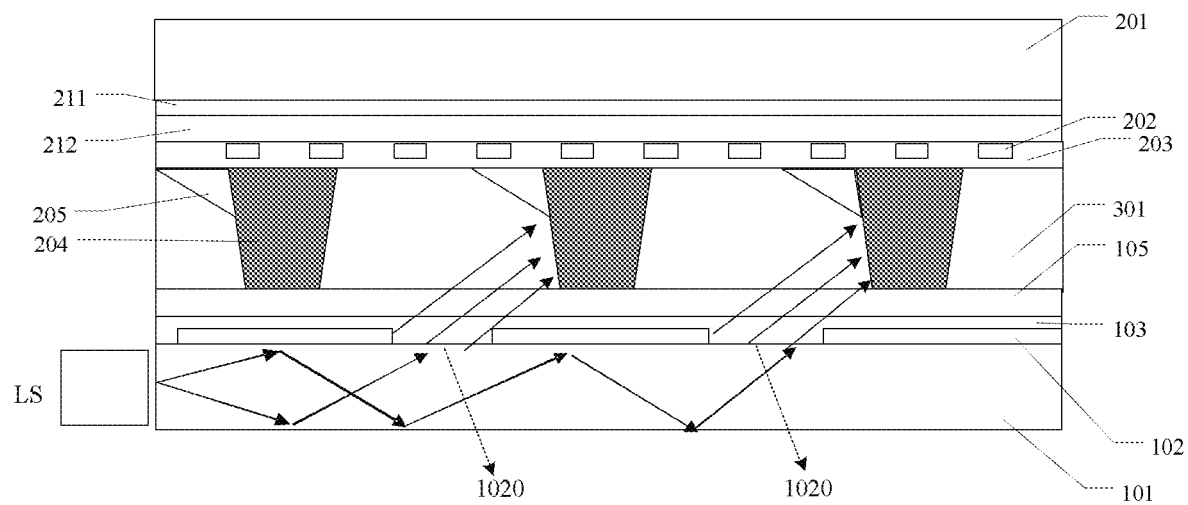
FIG. 14A is a sectional view of a display panel provided by another embodiment of the present disclosure.

FIG. 14A is a sectional view of a display panel provided by another embodiment of the present disclosure. For example, as illustrated in FIG. 14A, the first electrode 211 is a plate-shaped electrode and the second electrode 202 is a slit electrode. The first electrode 211 and the second electrode 202 are located at the same side of the liquid crystal layer 301, so as to form an in-plane electric field. The rest can refer to the description about FIG. 4A.

Figure 14B:
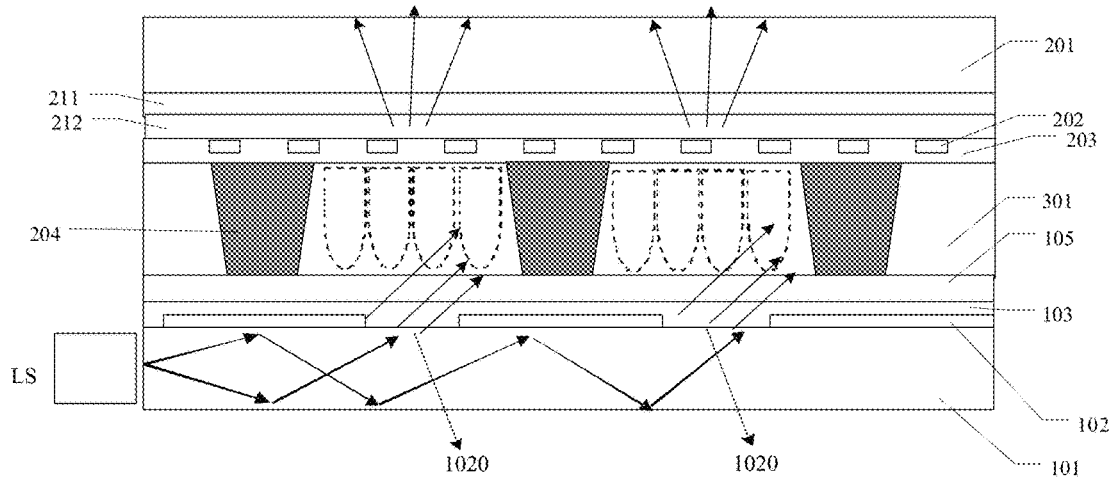
FIG. 14B is a sectional view of another display panel provided by another embodiment of the present disclosure.

FIG. 14B is a sectional view of another display panel provided by another embodiment of the present disclosure. The display panel provided by this embodiment is not provided with any reflective element. By adjusting the voltage input to at least one of the first electrode and the second electrode, the light exiting from the opening 1020 can be refracted by the liquid crystal molecules when passing through the liquid crystal layer, and then go out from the opposite substrate, thereby realizing display. As illustrated in FIG. 14B, the display surface of the display panel is the side where the opposite substrate is located.

Figure 15:
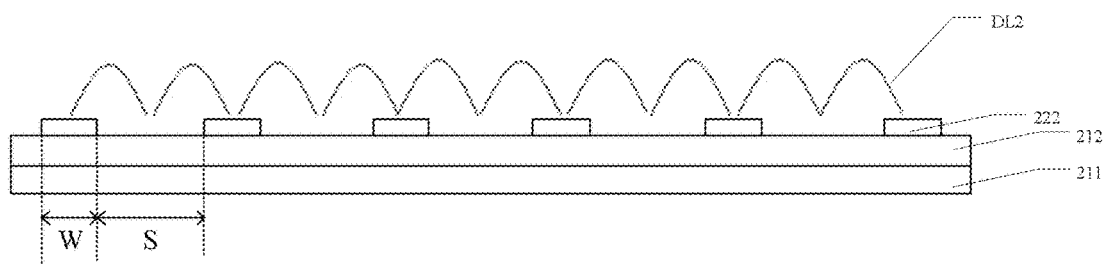
FIG. 15 is a schematic diagram of an electric field formed by a first electrode and a second electrode in a display panel provided by an embodiment of the present disclosure.

FIG. 15 is a schematic diagram of an electric field formed by a first electrode and a second electrode in a display panel provided by an embodiment of the present disclosure. The electric field line DL2 is illustrated in FIG. 15. A width of the electrode strip is W, and a distance between adjacent electrode strips is S. The period of electrode is the sum of W and S. The period of the liquid crystal grating is one half of the electrode period.

Figure 16:
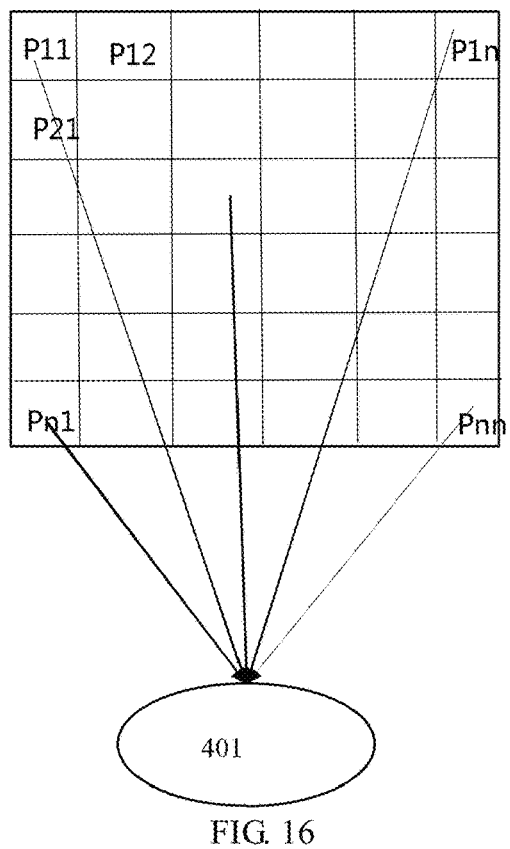
FIG. 16 is a schematic diagram of a display panel, provided by an embodiment of the present disclosure, viewed by an observer.

FIG. 16 is a schematic diagram of a display panel provided by an embodiment of the present disclosure viewed by an observer. Images displayed by a plurality of sub-pixels in the display panel are observed by human eyes 401 of an observer. The display panel in FIG. 16 includes a plurality of sub-pixels arranged in n rows and n columns, but this embodiment of the present disclosure is not limited to this, and the arrangement mode of the sub-pixels can be determined as required.

An embodiment of the present disclosure further provides a display device, including any of the above display panels. The display device can be a liquid crystal display device. The display device can be a liquid crystal display device and any products or components with display functions such as televisions, digital cameras, mobile phones, watches, tablet computers, notebook computers, navigators, etc., which include the liquid crystal display device.

It should be noted that, in order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

In the embodiments of the present disclosure, patterning or a patterning process may include only a photolithography process, or include a photolithography process and an etching process, or may include other processes for forming a predetermined pattern, such as a printing process, an inkjet process, and the like. A photolithography process includes forming a pattern by processes such as film forming, exposure, and development etc., by using photoresist, mask, exposure machine etc. The corresponding patterning process may be selected according to the structure formed in the embodiments of the present disclosure.

In case of no conflict, features in one embodiment or in different embodiments can be combined.

What have been described above are only specific implementations of the present disclosure, the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims.

What is claimed is:

1. A display panel, comprising a display substrate and an opposite substrate opposite to the display substrate,
   the display substrate, comprising:
   an optical waveguide;
   a first buffer layer at a side of the optical waveguide, the first buffer layer comprising a first buffer pattern and a plurality of openings defined by the first buffer pattern; and
   a second buffer layer at the side of the optical waveguide provided with the first buffer layer and at least covering the plurality of openings,
   wherein a refractive index of the first buffer pattern is less than a refractive index of the optical waveguide, and a refractive index of the second buffer layer is greater than the refractive index of the optical waveguide,
   wherein the display substrate and the opposite substrate are sealed to form a cell, and a spacer pattern is arranged in the cell, the spacer pattern comprises a plurality of spacers, and a space between adjacent spacers is filled with a liquid crystal material, and each of the plurality of spacers is configured to keep a thickness of the cell and absorb light irradiated thereon, and
   wherein the display panel further comprises a reflective element, wherein the reflective element is at a side of the spacer close to the opposite substrate, and the reflective element has a reflective surface configured to reflect light.

2. The display panel according to claim 1, wherein the optical waveguide comprises a first portion and a second portion, the first portion is at a position of the first buffer pattern, and the second portion is at a position of the plurality of openings;
   the first portion is configured to allow light which propagates in the optical waveguide and irradiates on the first portion to be totally reflected;
   the second portion is configured to allow light which propagates in the optical waveguide and irradiates on the second portion to exit.

3. The display panel according to claim 1, wherein the second buffer layer comprises a plurality of buffer portions, each of the plurality of buffer portions fills one of the plurality of openings, and the plurality of buffer portions have different refractive indices.

4. The display panel according to claim 1, wherein a size of the space between adjacent spacers in a direction parallel with the optical waveguide is greater than a size of each of the plurality of openings in the direction parallel with the optical waveguide.

5. The display panel according to claim 1, wherein an orthographic projection of the spacer on the optical waveguide falls within an orthographic projection of the first buffer layer on the optical waveguide.

6. The display panel according to claim 1, wherein an orthographic projection of the spacer on the optical waveguide does not overlap with an orthographic projection of the plurality of openings on the optical waveguide.

7. The display panel according to claim 1, wherein the spacer comprises a first surface, a second surface, a third surface, and a fourth surface, the first surface is opposite to the second surface, the third surface is opposite to the fourth surface, the first surface is close to the optical waveguide, the second surface is close to the opposite substrate, and the third surface and the fourth surface are between the first surface and the second surface,
   the reflective element is on at least one of the third surface and the fourth surface.

8. The display panel according to claim 1, wherein the reflective surface has an inclination angle of 9 to 13 degrees with respect to at least one of the optical waveguide and the opposite substrate.

9. The display panel according to claim 1, wherein a size of the reflective element in a direction perpendicular to the optical waveguide is less than one half of a size of the spacer in the direction perpendicular to the optical waveguide.

10. The display panel according to claim 1, wherein a size of the reflective element in a direction perpendicular to the optical waveguide is less than one third of a size of the spacer in the direction perpendicular to the optical waveguide.

11. The display panel according to claim 1, further comprising a first alignment layer at a side of the optical waveguide close to the opposite substrate and a second alignment layer at a side of the opposite substrate close to the optical waveguide, wherein the spacer is in contact with the first alignment layer and the second alignment layer, respectively.

12. The display panel according to claim 1, further comprising a first electrode and a second electrode, wherein the first electrode and the second electrode are configured to form an electric field to drive liquid crystal molecules to rotate;
   at least one of the first electrode and the second electrode is a slit electrode.

13. The display panel according to claim 12, wherein the first electrode comprises a plurality of first electrode strips, the second electrode comprises a plurality of second electrode strips, an orthographic projection of the first electrode strips on the optical waveguide and an orthographic projection of the second electrode strips on the optical waveguide do not overlap; or,
   the first electrode is a plate-shaped electrode, and the second electrode is a slit electrode.

14. The display panel according to claim 12, wherein one of the first electrode and the second electrode is arranged on the optical waveguide, and the other of the first electrode and the second electrode is arranged on the opposite substrate; or, the first electrode and the second electrode are both arranged on the optical waveguide or on the opposite substrate.

15. The display panel according to claim 1, further comprising a light source, wherein the light source is at least arranged at one side of the optical waveguide; and the light source is configured to provide light propagating in the optical waveguide and being totally reflected.

16. A display device, comprising the display panel according to claim 1.

17. The display panel according to claim 1, wherein the reflective surface is inclined with respect to at least one of the optical waveguide and the opposite substrate.

18. The display panel according to claim 1, wherein a plurality of sub-pixels are provided, wherein each of the plurality of sub-pixels comprises a plurality of reflective elements, and the plurality of reflective elements comprise two reflective elements having different inclination angles with respect to at least one of the optical waveguide and the opposite substrate.

19. A display panel, comprising a display substrate and an opposite substrate opposite to the display substrate,
the display substrate, comprising:
an optical waveguide;
a first buffer layer at a side of the optical waveguide, the first buffer layer comprising a first buffer pattern and a plurality of openings defined by the first buffer pattern; and
a second buffer layer at the side of the optical waveguide provided with the first buffer layer and at least covering the plurality of openings,
wherein a refractive index of the first buffer pattern is less than a refractive index of the optical waveguide, and a refractive index of the second buffer layer is greater than the refractive index of the optical waveguide,
wherein the display substrate and the opposite substrate are sealed to form a cell, and a spacer pattern is arranged in the cell, the spacer pattern comprises a plurality of spacers, and a space between adjacent spacers is filled with a liquid crystal material, and each of the plurality of spacers is configured to keep a thickness of the cell and absorb light irradiated thereon, and
wherein the display panel further comprises a reflective element, wherein the reflective element is at a side of the spacer close to the opposite substrate, and the reflective element has a reflective surface configured to reflect light,
wherein the reflective surface is inclined with respect to at least one of the optical waveguide and the opposite substrate.

20. A display panel, comprising a display substrate and an opposite substrate opposite to the display substrate,
the display substrate, comprising:
an optical waveguide;
a first buffer layer at a side of the optical waveguide, the first buffer layer comprising a first buffer pattern and a plurality of openings defined by the first buffer pattern; and
a second buffer layer at the side of the optical waveguide provided with the first buffer layer and at least covering the plurality of openings,
wherein a refractive index of the first buffer pattern is less than a refractive index of the optical waveguide, and a refractive index of the second buffer layer is greater than the refractive index of the optical waveguide,
wherein the display substrate and the opposite substrate are sealed to form a cell, and a spacer pattern is arranged in the cell, the spacer pattern comprises a plurality of spacers, and a space between adjacent spacers is filled with a liquid crystal material, and each of the plurality of spacers is configured to keep a thickness of the cell and absorb light irradiated thereon, and
wherein the display panel further comprises a reflective element, wherein the reflective element is at a side of the spacer close to the opposite substrate, and the reflective element has a reflective surface configured to reflect light, and
the display panel comprises a plurality of sub-pixels, wherein each of the plurality of sub-pixels comprises a plurality of reflective elements, and the plurality of reflective elements comprise two reflective elements having different inclination angles with respect to at least one of the optical waveguide and the opposite substrate.

* * * * *